(12) United States Patent
Genty et al.

(10) Patent No.: US 7,748,000 B2
(45) Date of Patent: Jun. 29, 2010

(54) FILTERING A LIST OF AVAILABLE INSTALL ITEMS FOR AN INSTALL PROGRAM BASED ON A CONSUMER'S INSTALL POLICY

(75) Inventors: Denise M. Genty, Austin, TX (US);
Mark B. Gunning, Austin, TX (US);
James S. Tesauro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1006 days.

(21) Appl. No.: 11/460,421

(22) Filed: Jul. 27, 2006

(65) Prior Publication Data
US 2008/0028389 A1 Jan. 31, 2008

(51) Int. Cl.
*G06F 9/445* (2006.01)
(52) U.S. Cl. .................. 717/176; 717/174; 717/175; 717/177
(58) Field of Classification Search .......... 717/176
See application file for complete search history.

(56) References Cited

U.S. PATENT DOCUMENTS

| 5,875,327 | A | 2/1999 | Brandt et al. | |
| 6,859,879 | B2 | 2/2005 | Henn et al. | |
| 6,859,923 | B2 * | 2/2005 | Taylor ..................... | 717/172 |
| 7,568,195 | B2 * | 7/2009 | Markley et al. ............. | 717/175 |
| 2002/0100036 | A1 | 7/2002 | Moshir et al. | |
| 2002/0174422 | A1 * | 11/2002 | Kelley et al. ................. | 717/178 |
| 2003/0182656 | A1 * | 9/2003 | Leathers et al. ............. | 717/177 |
| 2004/0003266 | A1 | 1/2004 | Moshir | |
| 2004/0210653 | A1 | 10/2004 | Kanoor et al. | |
| 2005/0066019 | A1 | 3/2005 | Egan et al. | |
| 2005/0120106 | A1 | 6/2005 | Albertao | |
| 2005/0182958 | A1 | 8/2005 | Pham et al. | |
| 2005/0182966 | A1 | 8/2005 | Pham et al. | |
| 2005/0257214 | A1 | 11/2005 | Moshir | |
| 2006/0080658 | A1 | 4/2006 | Marion et al. | |
| 2006/0101457 | A1 | 5/2006 | Zweifel et al. | |
| 2006/0123414 | A1 * | 6/2006 | Fors et al. ................... | 717/177 |
| 2007/0033586 | A1 * | 2/2007 | Hirsave et al. .............. | 717/174 |

OTHER PUBLICATIONS

Day et al., "Custom Device Installation", IBM Technical Disclosure Bulletin, vol, 38, pub. 10, Oct. 1995, pp. 569-570.

* cited by examiner

*Primary Examiner*—Thomas K Pham
(74) *Attorney, Agent, or Firm*—Matthew W. Baca; Amy J. Pattillo

(57) ABSTRACT

An install program is enabled for a user to configure at least one location of at least one policy system that is to be accessed via a network to gather at least one install policy, where the install policy specifies a policy for filtering out a selection of install items from among multiple items installable by the install program. In addition, the install program retrieves the install policy from each accessed location when filtering a list of the items installable by the install program to only include a particular selection of install items for the client system as directed by accessed install policies.

14 Claims, 7 Drawing Sheets

FILTERING A LIST OF AVAILABLE INSTALL ITEMS FOR AN INSTALL PROGRAM BASED ON A CONSUMER'S INSTALL POLICY

BACKGROUND OF THE INVENTION

1. Technical Field

The present invention relates in general to improved autonomic installation in computing systems. In particular, the present invention relates to an install program that filters the list of available install items presented to a user and more particularly to filtering, by a software provider install program, a list of available install items for an application based on a consumer's install policy pointed to by a configurable install policy setting within the software provider install program.

2. Description of the Related Art

Autonomic computing systems focus on developing distributed networks that are largely self-managing, self-diagnostic, and transparent to users. Conventional software installation techniques, however, are not very autonomic and often require intense user intervention. In particular, when software developers distribute applications or patches to applications, software developers will often provide an install program to control installation or application of patches and other installable items to a computer system. These install programs, however, typically either automatically apply the entire application package or patch set or require a user to manually select which portions of an application package to install or patches to apply.

In one attempt at a more automated installation solution, a software provider may also provide an install program that applies a policy, set by the software provider, that requires determining which patches are available for installation to a particular computer system and scanning the particular computer system to compile a list of already installed patches, before presenting the user with a filtered choice of patches that are available, but not already installed. In addition, the software provider may further specify the policy with particular patches assigned as having a higher priority by the software provider. Based on the user's manual selection of patches from the choice of patches, the install program downloads and applies the user selected patches. Alternatively, a user may select to automatically install the choice of patches.

Many customers, particularly customers who run large networks of computers, will end up manually selecting only a portion of the available application package or patches in testing the effects of new patches on the stability of a particular computer system or a network of computer systems. Further, many customers, once it has been determined which patches will not disrupt the stability of a particular computer system or network of computer systems, only want to apply the customer-determined selection of patches.

Thus, while an install program that applies a policy set by the software provider to present the user with a filtered choice of patches may reduce the number of selectable patch options, for a larger customer, who installs an application across multiple systems, and wants to customize the selection of patches applied to the application across those multiple systems, the update function does not improve the autonomic installation process. For example, a software provider provides three patches, A, B, and C for an application D. Within a customer's network of multiple systems, application D is already installed on each system, but patches A, B, and C are not already applied to the installed application. For the customer to apply only patches A and B at each of the multiple systems, the customer will have to run the install program on each individual system and within the choice of patches presented, of patches A, B, and C, manually select only patches A and B for install. This process of the user running the install program on each system and then manually selecting patches A and B from a list of patches becomes exponentially more time consuming as the number of systems and number of applications, each with multiple patches, increases.

In addition, while an install program that applies a policy set by the software provider presents the user with the software provider's prioritization of the filtered choice of patches, a software provider's priorities are not necessarily those of the customer. Thus, while the software provider may indicate to the customer those patches within the filtered choice of patches the software provider deems most important, a customer is still only provided with an option of manually selecting patches, at each system, from a choice of patches filtered according to the software provider's priorities.

Therefore, to provide a more autonomic installation solution, there is an ongoing need for method, systems, and products for enabling a consumer to specify an install policy and enabling a customer to configure an install program to access and apply that install policy as the install program selects a filtered choice of install items, such as patches, available for installation at a particular system, such that the customer's install policy is reusable across multiple systems at which the install program may run and the customer's install policy directs the filtering of install options to automatically provide the customer with a customer-determined selection of install items from among the available install items.

SUMMARY OF THE INVENTION

Therefore, the present invention provides improved autonomic installation in computing systems. In particular, the present invention provides an install program that filters the list of available install items presented to a user and more particularly to filtering, by a software provider install program, a list of available install items for an application based on a consumer's install policy pointed to by a configurable install policy setting within the software provider install program.

In one embodiment, an install program is enabled for a user to configure at least one location of at least one policy system that is to be accessed via a network to gather at least one install policy for a client system, where the install policy specifies a policy for filtering out a selection of install items from among multiple items installable by the install program. In addition, the install program retrieves the install policy from each accessed location when filtering a list of the items installable by the install program to only include a particular selection of install items for the client system as directed by accessed install policies.

An install policy may include rules for automatically installing a particular install item, disallowing installation of a particular install item, or setting a priority level for a particular install item.

In addition, the install program may access a list of already installed items at the client system, filter the list of items installable by the install program to remove the list of already installed items, and filter the filtered list of items installable by the install program to include the particular selection of install items for the client system as directed by the accessed install policies.

Further, if the install program accesses multiple install policies, the install program combines the policies. The install program accesses rules for combining the install policies from within one or more install policies or from other settings by a user, the install program, or a policy server.

In addition, the install program controls the presentation, to a user, of a selectable list of the particular selection of install items with a selectable option to trigger installation. Responsive to a user selection of a second selection of the particular selection of install items and a user selection of the selectable option to trigger installation, the install program is triggered to only install the second selection of the particular selection of install items.

Further, the install program directs display, within a graphical user interface, of an option for a user to select to configure at least one location of at least one install policy. Responsive to the user selection of at least one location within the graphical user interface, at least one location of at least one install program is configured within the install program.

In addition, the install program may be distributed across multiple systems, including a client system and a provider server system, via a network. The provider server system accesses the user configuration of at least one location of at least one install policy, retrieves the an install policy from each location, and filters the list of install items according to the accessed install policies to create the particular selection of install items. The install program installs the particular selection of install items.

A policy server is enabled to control distribution of multiple install policies to install programs associated with multiple client systems. The policy server includes a hierarchical mapping of the client systems, wherein each of the client systems is mapped to one of the hierarchical levels within a network environment. The policy server also includes a listing of at least one separate install policy associated with each of the hierarchical levels. The policy server, responsive to receiving a request for an install policy by a particular install program associated with a particular client system determines a particular hierarchical level of the particular client system within the hierarchical mapping, accesses a selection of at least one install policy associated with the hierarchical level according to the listing, and delivers the selection of the at least one install policy to the install program, such that a user need only configure the install program to a single policy server location and the policy server determines the applicable install policies for that client system.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
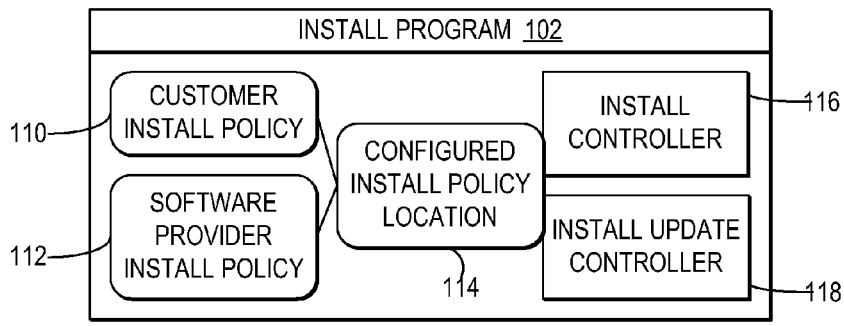
FIG. 1 is a block diagram illustrating an install program enabled for customer configuration of selected install policies and enabled to access and apply the customer selected install policies designated in a filtered install selection list.

In general, in the present invention, an install program includes at least one install function for applying install items to an application and at least one filter function for filtering the available install items according to an install policy. In addition, the install program is enabled for configuration, by a user, to point to one or more locations of one or more install polices for application by the at least one filter function and the install program is enabled to access the one or more install polices at the pointed to one or more locations. Thus, each separate user of the install program may configure the install program to access an install policy at a separate location, so that the at least one filter function will filter the available install items based on each separate install policy requested by each separate user. In addition, separate users of the install program may configure the install program to access a same install policy at a same location.

As used throughout, the term "install item" may include items installable for an application, patches applicable to an application, and other installable items for firmware and hardware drivers, for example. The term "patch" may include, but is not limited to, software designed as an upgrade to an application, to fix a bug in an application, to provide a new hardware driver for use in a system or by an application, or to provide additional security or stability in an application or system. With reference to an "install items", references are made interchangeably to applying or installing an install item.

In addition, as used throughout, the terms "user" or "customer" are used interchangeably to refer to an entity which configures the location of an install policy for an install program, independent of the provider of the install program or the install items. The provider of the install program may be a separate entity from the provider of the install items. In addition, the functional components of the install program may be provided by different providers. A provider may include, but is not limited to, the programmer, packager, distributor, or manufacturer.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art that the present invention may be executed in a variety of systems, including a variety of computer systems and electronic devices operating any number of different types of operating systems. In general, the present invention is executed in one or more computer systems that perform computing tasks such as manipulating data in storage that is accessible to the computer system.

Referring now to the figures, FIG. 1 depicts a block diagram illustrating an install program enabled for customer configuration of selected install policies and enabled to access and apply the customer selected install policies in designated a filtered install selection list. In the example, an install program 102 includes multiple functional components and multiple data components. It is important to note that each of these functional and data components may reside on a single system, a group of systems, or may each reside on one or more computing systems within a distributed network and are not limited to functioning on a single system.

In the example, install program 102 includes an install controller 116. Install controller 116 provides a function for installing within a client system or applying, to an application, a selection of install items, where the selection of install items is directed by an install update controller 118. As will be further described, in one embodiment, install controller 116 may locally incorporate one or more install items for installation at a client system or install controller 116 may access selected install items from at least one other system over a network.

In addition, in the example, install program 102 includes a configured install policy location 114. Configured install policy location 114 includes the location of one or more install polices, such as the locations of customer install policy 110 and software provider install policy 112. An install policy may be located locally, in a file system or data storage medium, or remotely, at a location accessible via a network, such as a server. Configured install policy location 114 may include an actual network address location at which an install policy is stored, a network address for a server system at which an install policy is stored, a file system location, or other types of location identifiers that would enable install program 102 to access the identified install policy. As will be further described, a customer configures the locations specified in configured install policy location 114 through multiple types of interfaces including, but not limited to, an API interface, a text editor with an editable configuration file, and a browser interface. The locations represented by configured install policy location 114 may be written into install controller 116, install update controller 118, a separate data entity, or a network accessible data storage system. It is important to note that while install program 102 is described with reference to configured install policy location 114 specified to point to two install polices, in other embodiments, additional or alternate install polices may be pointed to and configured install policy location 114 need not point to a software provider install policy or may automatically point to a software provider install policy.

Further, in the example, install program 102 includes an install update controller 118. Install update controller 118 accesses a list of available install items, from install controller 116 or via a network, and automatically filters that list of available install items to create a filtered install item selection list. A user may then select for install controller 116 to apply all the install items in the filtered install item selection list or may further adjust the selection of install items in the filtered install selection list by selecting particular install items from the originally filtered list.

In particular, in determining those patches to include in the filtered install item selection list, install update controller 118 first accesses the locations specified in configured install policy location 114 and then accesses the one or more separate install polices pointed to by the locations within configured install policy location 114, such as both customer install policy 110, specified by the customer, and software provider install policy 112, specified by the software provider of the install items. Next, install update controller 118 combines the accessed install polices according to rules, where the rules may be specified within install policies, including rules specified within customer install policy 110. Thereafter, install update controller 118 accesses a list of available install items, either from another system or from install controller 116 and filters the list of available install items according to the combined install policies to determine the filtered install item selection list. Install update controller 118 may either automatically install the install items specified in the filtered install item selection list or present the user with the option to further filter those install items included in the filtered install item selection list or to select to automatically install the install items specified in the filtered install item selection list.

An install policy may specify policies for controlling different types of filtering to determine the filtered install item selection list. In one example, an install policy may require install update controller 118 to access a list of install items already installed at a particular system, or scan the system to determine a list of install items already installed, and filter the list of available install items to remove those install items already installed at the particular system. In another example, an install policy may require install update controller 118 to apply a "criticality" or priority level in reordering the selected list of install items from most critical to least or in labeling the listing of each install item in the filtered install selection list. Further, an install policy may require install update controller 118 to automatically remove one or more of the available install items from the filtered install selection list. In yet another example, an install policy may require install update controller 118 designate one or more of the available install items as required to be installed, automatically, regardless of any further user inputs and specify for install update controller 118 to distinguishably mark the one or more required install items in the filtered install selection list.

It is important to note that while the present invention is described with reference to an install program provided by a software provider, in alternate embodiments, entities in addition to or other than the provider of the install items accessible for application by install program 102 may provide install program 102. The advantage of install program 102 is that while the provider of install program 102 may or may not set a policy for filtering the available install items, the provider of install program 102 enables install program 102 to be configurable, by a customer or other user, to identify particular install polices for use in filtering the available install items and enables install program 102 to access the other install policies from locations identified by the user.

Figure 2:
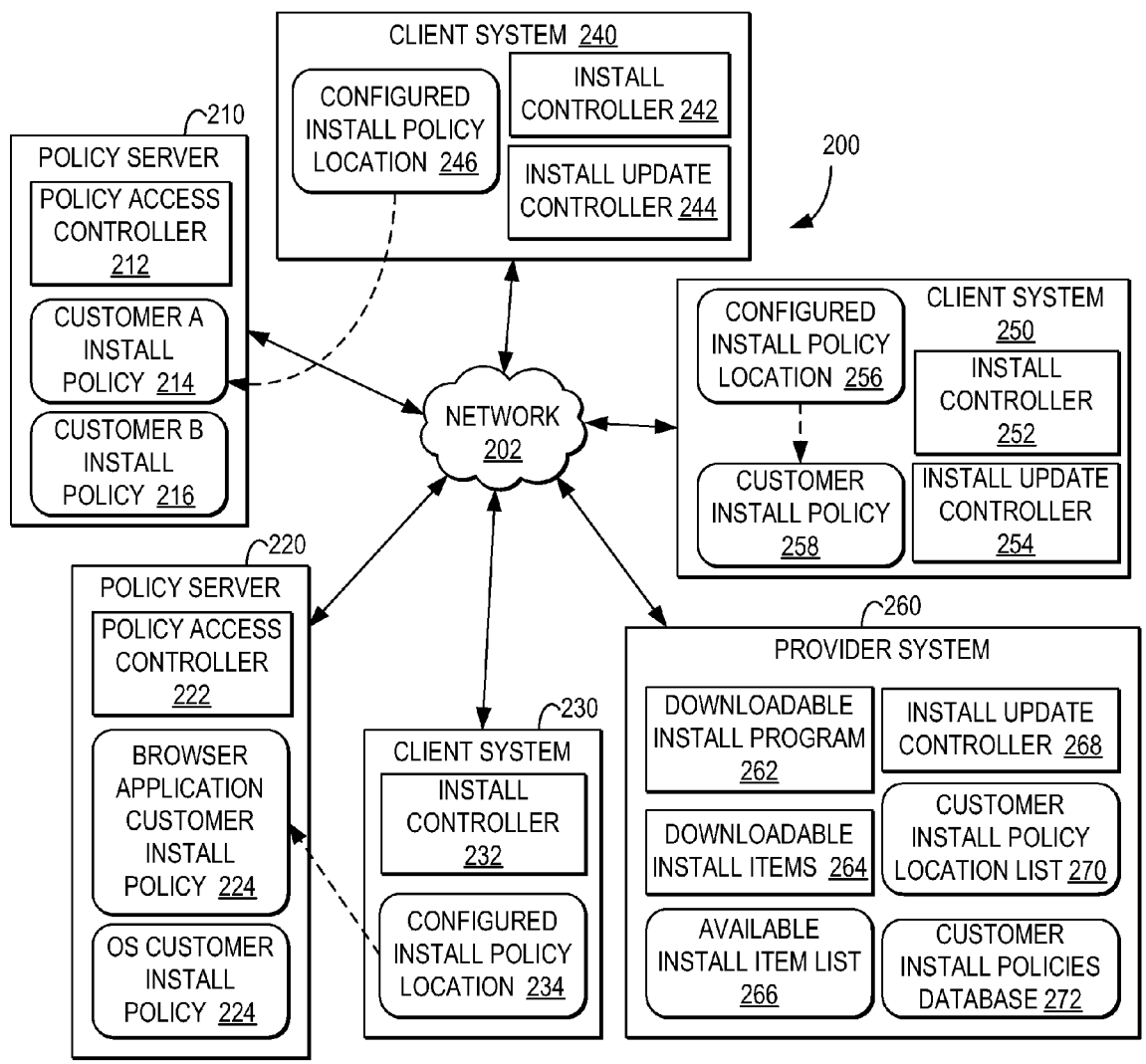
FIG. 2 is a block diagram illustrating a distributed network environment in which an install program, enabled for configuration by a customer to access one or more install polices from one or more locations, accesses the install polices from the configured locations and generates a filtered install item selection list according to the accessed patch polices.

With reference now to FIG. 2, a block diagram illustrates a distributed network environment in which an install program, enabled for configuration by a customer to access one or more install polices from one or more locations, accesses the install polices from the configured locations and generates a filtered install item selection list according to the accessed install polices. Network environment 200 is a distributed network of computer systems in which one embodiment of the invention may be implemented. It will be understood that other embodiments of systems enabled to communicate via a connection may implement the present invention.

In the embodiment, network environment 200 includes network 202, which is the medium used to provide communication links between various devices and computer system connected together within network environment 200. Network 202 may include permanent connections, such as wire or fiber optics cables, and temporary connections made through telephone connections and wireless transmission connections, for example. In addition, network 202 may represent one or more types of network elements implemented for enabling communicative connections between systems. For example, network 202 may include, but is not limited to, the Internet, a wide area networks (WANs), a local area networks (LANs), an Ethernet, a token ring, and a network service providers. Further, network 202 may transport data between systems using one or more types of communication protocols. In one example, network 202 implements protocols for transferring data within a packet-switching network, such as using the transmission control protocol/internet protocol (TCP/IP), however, network 202 may include multiple gateways, routers, and other hardware, software and other elements to enable integration of networks using additional or alternate protocols and additional or alternate layers of protocols.

Network 202 enables communicative connection between systems. In the example, network 202 enables communicative connection between multiple systems, including, but not limited to, a policy server 210, a policy server 220, a client system 230, a client system 240, a client system 250, and a provider system 260. It will be understood that each of policy server 210, policy server 220, client system 230, client system 240, client system 250, and provider system 260 may be distributed in geographically the same or disparate locations throughout homogeneous or heterogeneous types of computing systems operating within the same or disparate local networks. It will be understood that network 202 may enable communicative connection between additional or alternate systems and that network environment 200 may include additional servers, clients, networks, and other devices that are not shown.

In one embodiment, network environment 200 implements a client/server architecture where servers respond to requests from client systems and client systems perform as clients requesting data from servers. In addition, despite the labels on different systems illustrated within network environment 200, each of the systems may function as both a "client" and a "server" and may be implemented as a computer system through a single or multiple computers systems, such as computer system 300 of FIG. 3, as will be further described. Further, while the present invention is described with emphasis upon systems functioning as either a server or a client, client systems, such as client system 230, client system 240, or client system 250, may control communication by engaging in peer-to-peer network communications via network 202. Further, network environment 200 may implement additional or alternate types of architectures.

Within network environment 200, one or more systems may provide access, via network 202, to one or more install policies. An install policy may by defined within a document, an applet, or other data entity, that includes policies for use by an install update controller in filtering available patches to determine a filtered install selection list. By placing install policies at systems that are accessible via network 202 to other systems, a single install policy is accessible to multiple instances of an install program running at different client systems.

In one example of a policy system, a policy server 210 includes a policy access controller 212 for controlling distribution of a customer A policy install 214 and a customer B policy install 216. Thus, in the example, policy server 210 stores install policies for multiple customers. In one example, policy server 210 may represent a service provider, for providing storage space for customers to place install policies. In another example, policy server 210 may represent a service provider who detects or receives install policies set by different customers and makes those install policies available to any user.

In another example of a policy system, policy server 220 includes a policy access controller 222 for receiving requests for either of a browser application customer install policy 224 and an operating system (OS) customer install policy 224 and controlling distribution of the requested install policy.

It will be understood that either of policy server 220 and policy server 230 may be implemented as a single server system or through multiple server systems. Further, it will be understood that each of policy server 220 and policy server 230 may implement one or more types of security for access and transport of data.

In yet another example of a policy system, client system 250 may function as a server and distribute a customer install policy 258. In one example, a customer may create customer install policy 258 and then publish that install policy for access by other users. Alternatively, customer install policy 258 may be downloaded to or otherwise stored at client system 250 from another system or data storage medium.

In addition, within network environment 200, one or more software providers may provide access, via network 202, to install items and all or a portion of an install program. In the example, provider system 260 illustrates one example of a system implemented by a provider to provide access to one or more downloadable install items and one or more install programs. It is important to note that network environment 200 may include one or more provider systems and that a provider system need not incorporate all of the functional components and data elements described in the example with reference to provider system 260. In addition, it is important to note that provider system 260 may be implemented through one or more server systems, where each server system may be individually accessible and may include only a portion of the components illustrated with reference to provider system 260.

In one example, all or portions of the components of install program 102 are downloadable to a client system. In particular, in the embodiment, provider system 260 includes a downloadable install program 262 that includes all or portions of the components of install program 102 and is downloadable from provider system 260 to other systems, such as client system 230, client system 240, or client system 250.

In another example, the install update controller portion of install program 102 may run at a server system. In particular, in the embodiment, provider system 260 includes an install update controller 268 that runs at provider system 260 and communicates with install controllers at client system.

In addition, in another example, the configured install policy location of install program 102 may be configured and stored at provider system 260. In particular, in the embodiment, provider system 260 includes a customer install policy location list 270 that includes the locations of install polices configured by customers. In one example, provider system 260 may provide an interface through which a customer may configure the locations of one or more install polices and select to store the configured locations in customer install policy location list 270 in association with a customer name or other identifier; provider system 260 may distribute the configured locations from customer install location list 270 to install update controllers running on client systems or provider system 260. In addition, provider system 260, prior downloading downloadable install program 262 to a client system, may automatically configure the configured install policy location to the location specified in customer install policy location list 270.

Further, in another example, provider system 260 may store customer install polices in a customer install polices database 272. In one example, provider system 260 may provide an interface through which a customer may select a customer install policy or upload a customer install policy to provider system 260 for storage in customer install policies database 272. By accessing customer install policies at provider system 260, a provider may detect patterns of policy selections for use in developing additional patches or refining the provider's install policy.

It is important to note that while FIG. 2 is illustrated with reference to a customer downloading all or portion of install program 102 from provider system 260, in additional or alternate embodiments, a customer may download install program 262, configure the install policy location for install program 262, and then offer the configured install program for download by other client systems. For example, a customer with a large network of systems, each requiring separate installations, may download downloadable install program 262, configure the install policy location, and then place the configured install program at a server system for download by all the customer's systems, such that the customer need not reconfigure the configured install policy location at each client system.

For purposes of example, different types of distributed configurations of install program 102 are illustrated within FIG. 2 and described herein. It will be understood that additional or alternate distribution of install program 102 and the additional functional components and data elements described within reference to FIG. 2, may be implemented and that additional configurations of install program 102 may be configured within the system examples illustrated in FIG. 2.

In one example, client system 230 only includes install controller 232 and configured install policy location 234. Thus, install program 102 is distributed across client system 230, policy server 220 and provider system 260. In particular, client system 230 includes install controller 232 that controls installation of selected install items and is configured to communicate with install update controller 238 to receive the selection of install items to install. In the example, a configured install policy location 234 is configured to point to browser application customer install policy 224. Thus, when installation is triggered, either by a user at client system 230, or automatically by install controller 232, install controller 232 establishes a connection with install update controller 268 and passes configured install policy location 234 to install update controller 268. Install update controller 268 requests browser application customer install policy 224 from policy server 220 and combines browser application customer install policy 224 with a provider install policy (not depicted) that is automatically applied by install update controller 268. Install update controller 268 filters an available install items list 266, which lists downloadable install items 264, by the combined install policy to available install item list 266, to generated a filtered install item selection list. In one example, the combined install policy may require that install controller 232 pass install update controller 268 a list of patches already installed at client system 230 and therefore, install update controller 268 compares the list of install items already installed at client system 230 with available install item list 266 to first filter out those install items already installed at client system 230. In another example, the combined install policy may require that install update controller 268 direct install controller 232 to automatically apply the filtered install items selection list. Install update controller 268 directs install controller 232 which selection of install items to install and install update controller 268 downloads that selection of install items from downloadable install items 264 and installs the selection at client system 230.

In this example, by distributing install controller 232 and install update controller 268 across different systems, a provider may provide install update controller 268 as a service to customers, such that fewer resources are used at client system 230 in the install process, install update controller 268 can be updated and modified by the provider without requiring corresponding updates at each client system, and a single install update controller at provider system 260 may interact with install controllers at different client systems and for different applications or providers.

In another example, install program 102 is distributed across client system 240 and policy server 210. In particular, client system 240 includes install controller 242 and install update controller 244. In addition, client system 240 includes a configured install policy location 246 that points to a customer A install policy 214 and customer B install policy 216. Thus, when installation is triggered, install update controller 244 reads configured install policy location 246 and accesses customer A install policy 214 from policy server 210. It is important to note that the install update controller may solely include install update controller 244, or may be distributed across install update controller 244 and install update controller 268. Once install update controller 244 delivers a list of selected install items to install controller 242, install controller 242 controls application of the selected install items and may download the selected install items from downloadable install items 264 of provider system 260.

In a further example, install program 102 is distributed within client system 250, which is communicatively connected to network 202. In the example, client system 250 includes an install controller 252 and an install update controller 254. In addition, client system 250 includes a configured install policy location 256 that points to a customer install policy 258, locally available to client system 250. Thus, when installation is triggered, install update controller 254 reads configured install policy location 256 and accesses customer install policy 258 locally within client system 250.

Client system 250 may receive customer install policy 258 through different media or a user may create customer install policy 258 at client system 250. In one example, a user may receive customer install policy 258 within or as an attachment to an electronic mail or other electronic communication, at client system 250, and store a copy of the customer install policy in one of the storage mediums of client system 250, including temporary storage. In another example, client system 250 may download customer install policy 258 from a server system or other client system, responsive to a user selection to download or responsive to another trigger. In yet another example, through an interface of install controller 252 or install update controller 254, a user may create customer install policy 258 and select to publish customer install policy 258 for access by other client systems.

Figure 3:
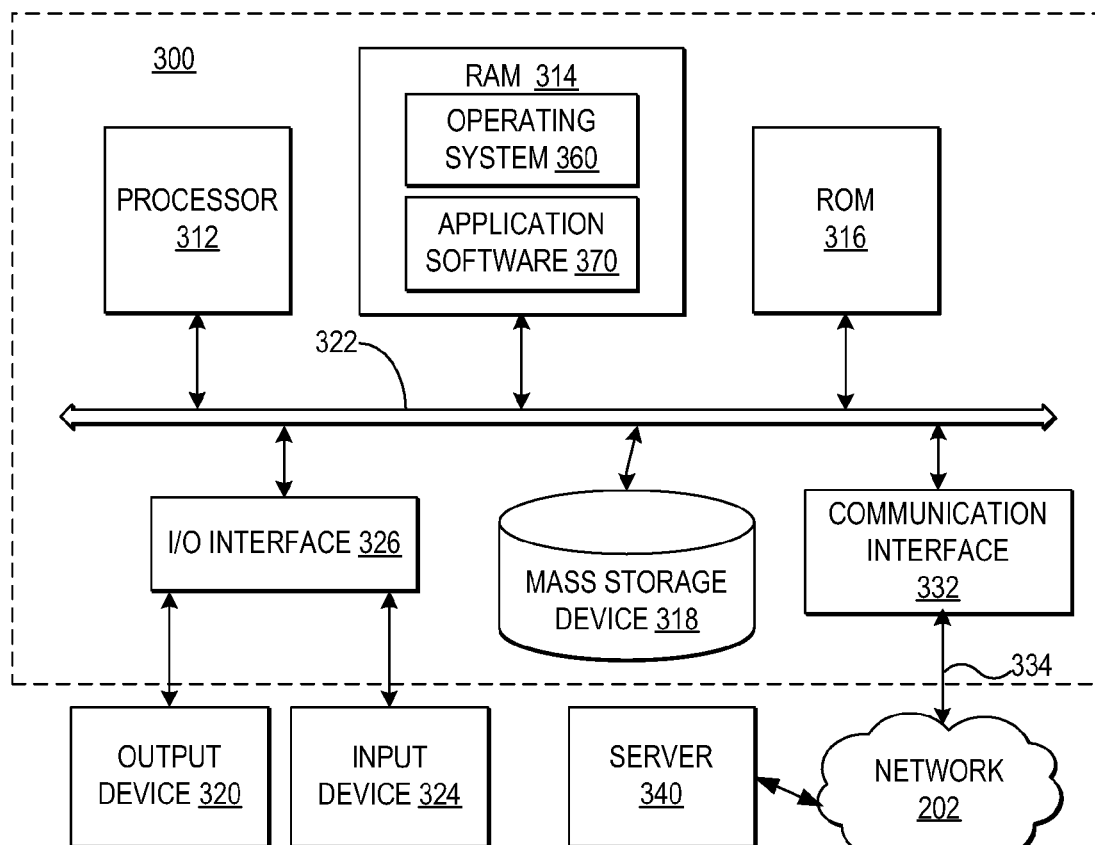
FIG. 3 is a block diagram depicting one embodiment of a computing system in which the present invention may be implemented.

Referring now to FIG. 3, a block diagram depicts one embodiment of a computing system in which the present invention may be implemented. The present invention may be executed in a variety of systems, including a variety of computing systems, such as computer system 300, communicatively connected to a network, such as network 202. For example, a policy server 210, a policy server 220, a client system 230, a client system 240, a client system 250, and a provider system 260 may be implemented using a computing system or grouping of computing systems, such as computer system 300. Further computing systems implemented within network 202 may be implemented using a computing system or grouping of computing systems, such as computer system 300.

Computer system 300 includes a bus 322 or other communication device for communicating information within computer system 300, and at least one processing device such as processor 312, coupled to bus 322 for processing information. Bus 322 preferably includes low-latency and higher latency paths that are connected by bridges and adapters and controlled within computer system 300 by multiple bus controllers. When implemented as a server, computer system 300 may include multiple processors designed to improve network servicing power. Where multiple processors share bus 322, additional controllers (not depicted) for managing bus access and locks may be implemented.

Processor 312 may be a general-purpose processor such as IBM's PowerPC (PowerPC is a registered trademark of International Business Machines Corporation) processor that, during normal operation, processes data under the control of an operating system 360, application software 370, middleware (not depicted), and other code accessible from a dynamic storage device such as random access memory (RAM) 314, a static storage device such as Read Only Memory (ROM) 316, a data storage device, such as mass storage device 318, or other data storage medium. In one embodiment, the operations performed by processor 312 may control accessing at least one install policy according to a customer configured location for the install policy and filtering a list of available install items according to the accessed customer install policy, as further described in the flowcharts in FIGS. 9, 10, and 11 and other operations described herein. Operations performed by processor 312 may be requested by operating system 360, application software 370, middleware or other code or the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 300 to perform a process according to the present invention. The term "machine-readable medium" as used herein includes any medium that participates in providing instructions to processor 312 or other components of computer system 300 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 300 can read and which is suitable for storing instructions. In the present embodiment, an example of a non-volatile medium is mass storage device 318 which as depicted is an internal component of computer system 300, but will be understood to also be provided by an external device. Volatile media include dynamic memory such as RAM 314. Transmission media include coaxial cables, copper wire or fiber optics, including the wires that comprise bus 322. Transmission media can also take the form of acoustic or light waves, such as those generated during radio frequency or infrared data communications.

Moreover, the present invention may be downloaded or distributed as a computer program product, wherein the program instructions may be transferred from a remote computer such as a server 340 to requesting computer system 300 by way of data signals embodied in a carrier wave or other propagation medium via network 202 to a network link 334 (e.g. a modem or network connection) to a communications interface 332 coupled to bus 322. Communications interface 332 provides a two-way data communications coupling to network link 334 that may be connected, for example, to a local area network (LAN), wide area network (WAN), or directly to an Internet Service Provider (ISP). In particular, network link 334 may provide wired and/or wireless network communications to one or more networks, such as network 202. Further, although not depicted, communication interface 332 may include software, such as device drivers, hardware, such as adapters, and other controllers that enable communication. When implemented as a server, computer system 300 may include multiple communication interfaces accessible via multiple peripheral component interconnect (PCI) bus bridges connected to an input/output controller, for example. In this manner, computer system 300 allows connections to multiple clients via multiple separate ports and each port may also support multiple connections to multiple clients.

Network link 334 and network 302 both use electrical, electromagnetic, or optical signals that carry digital data streams. The signals through the various networks and the signals on network link 334 and through communication interface 332, which carry the digital data to and from computer system 300, may be forms of carrier waves transporting the information.

In addition, computer system 300 may include multiple peripheral components that facilitate input and output. These peripheral components are connected to multiple controllers, adapters, and expansion slots, such as input/output (I/O) interface 326, coupled to one of the multiple levels of bus 322. For example, input device 324 may include, for example, a microphone, a video capture device, a body scanning system, a keyboard, a mouse, or other input peripheral device, communicatively enabled on bus 322 via I/O interface 326 controlling inputs. In addition, for example, a display device 320 communicatively enabled on bus 322 via I/O interface 326 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 3 may vary. Furthermore, those of ordinary skill in the art will appreciate that the depicted example is not meant to imply architectural limitations with respect to the present invention.

Figure 4:
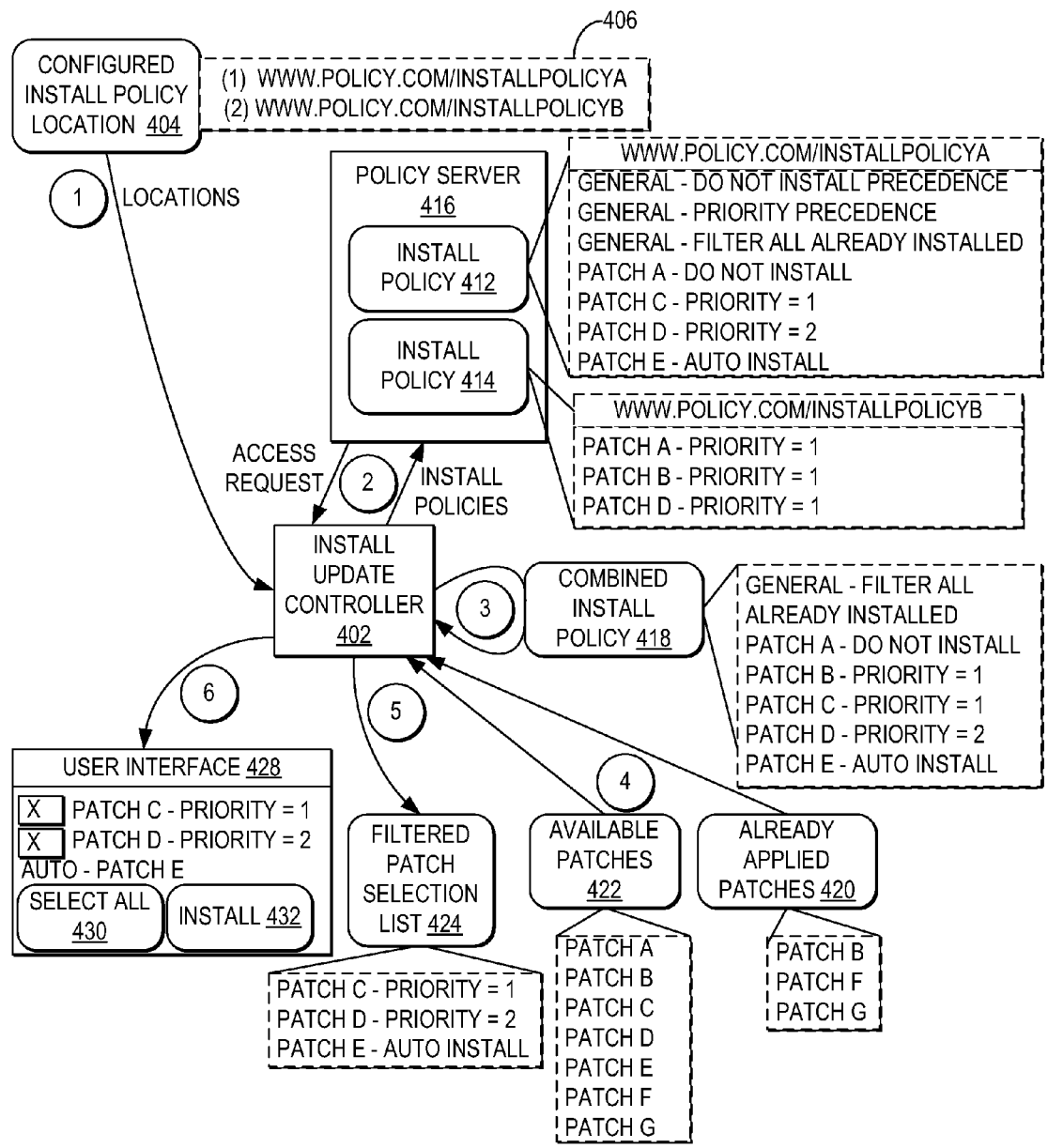
FIG. 4 is a block diagram illustrating an illustrative flow diagram of an install program accessing and implementing a customer's install policy for filtering patches available for application at a particular client system.

With reference now to FIG. 4, a block diagram depicts an illustrative flow diagram of an install program accessing and implementing a customer's install policy for filtering patches available for application at a particular client system. In the example, a user selects to trigger an install program for applying patches on a particular client system. In particular, in the example, responsive to an install request, an install update controller 402 is triggered and install update controller 402 accesses a list of locations for install policies from a configured install policy location 404. In the example, the locations for install policies include network accessible addresses "www.policy.com/installpolicyA" and "www.policy.com/installpolicyB" as illustrated at reference numeral 406. Next, patch update controller 402 accesses install polices 412 and 414, matching the network accessible addresses illustrated at reference numeral 406, from a policy server 416.

In the example, each of install policy 412 and install policy 414 includes a selection of patches, with priority levels of "1" (indicating a higher priority) or "2" (indicating a lower priority) assigned, a selection of patches with "do not install" assigned, and a selection of patches with "auto install" assigned. In addition, install policy 412 includes a preference for how to combine multiple policies, where install policy 412 specifies that "do not install" assignments in install policy 412 cannot be overridden by other policies and specifies that the priority assignments in install policy 412 should override priority assignments in install policy 414 and several other policies which are not accessed for the current client system. Further, install policy 412 includes a preference to filter out any patches already installed on the particular system. It is important to note that where there is not a precedence rule for choosing between multiple policies, install update controller 402 may apply a precedence rule from a provider's default policy.

As depicted, install update controller 402 combines install policy 412 and install policy 414 to create a combined install policy 418. Combined install policy 418 includes the general policy of filtering out all already applied patches from the filtered patch selection list. The precedence preferences of "do not install" and "priority" are applied in combining the policies. "Patch A" is set to "do not install" because install policy 412 has precedence for a "do not install" selection. "Patch B" is set to a priority level of "1" because install policy 414 sets a policy for "patch B", but install policy 414 does not set a policy for "patch B". "Patch C" is set to a priority level of "1" because install policy 412 is the only patch policy setting a priority level for "patch C". "Patch D" is set to a priority level of "2" because the priority level set in install policy 412 has precedence over the priority level set in install policy 414. "Patch E" is set to "auto install" because only install policy 412 sets a policy for "patch E".

Install update controller 402 accesses a list of the patches already installed on the particular client system, as illustrated at reference numeral 420 and accesses a list of the available patches for application, as illustrated at reference numeral 422. Although not depicted, install update controller 402 may access the list of available patches for application from a provider system or from an install controller and may access the list of already installed patches from the install controller or other software controller enabled to return a list of patches already installed on the client system.

As illustrated, install update controller 402 generates a filtered patch selection list 424. Install update controller 402 first applies the general policy to filter out already install patches, and filters out "patch B", "patch G", and "patch F" from the available patch list illustrated at reference numeral 422. In addition, install update controller 402 second applies the individual patch policies to filter out "do not install" patches, to adjust priority levels assigned to patches, and to designate patches for automatic installation. In the example, install update controller 402 filters out "patch A" because combined patch policy 418 specifies not to install "patch A". In addition, in the example, install update controller 402 assigns a priority level of "1" to "patch C" and "2" to "patch D". Further, in the example, install update controller 402 assigns "patch E" to be automatically installed.

As depicted, install update controller 402 may control output of filtered patch selection list 424 in a user interface 428 at which a user may select which patches to install. In particular, in the example, the user selects to install both "patch C" and "patch D" by selecting a box associated with the patch listing, however, because "patch E" is to be automatically installed, the user may not adjust the selection for "patch E". The user may select all the selectable patches at once by selecting select all button 430 or the user may individually select selectable patches. In addition, once the user has completed a selection, the user may select install button 430 to trigger install update controller 402 to pass the user selections to an install controller.

Figure 5:
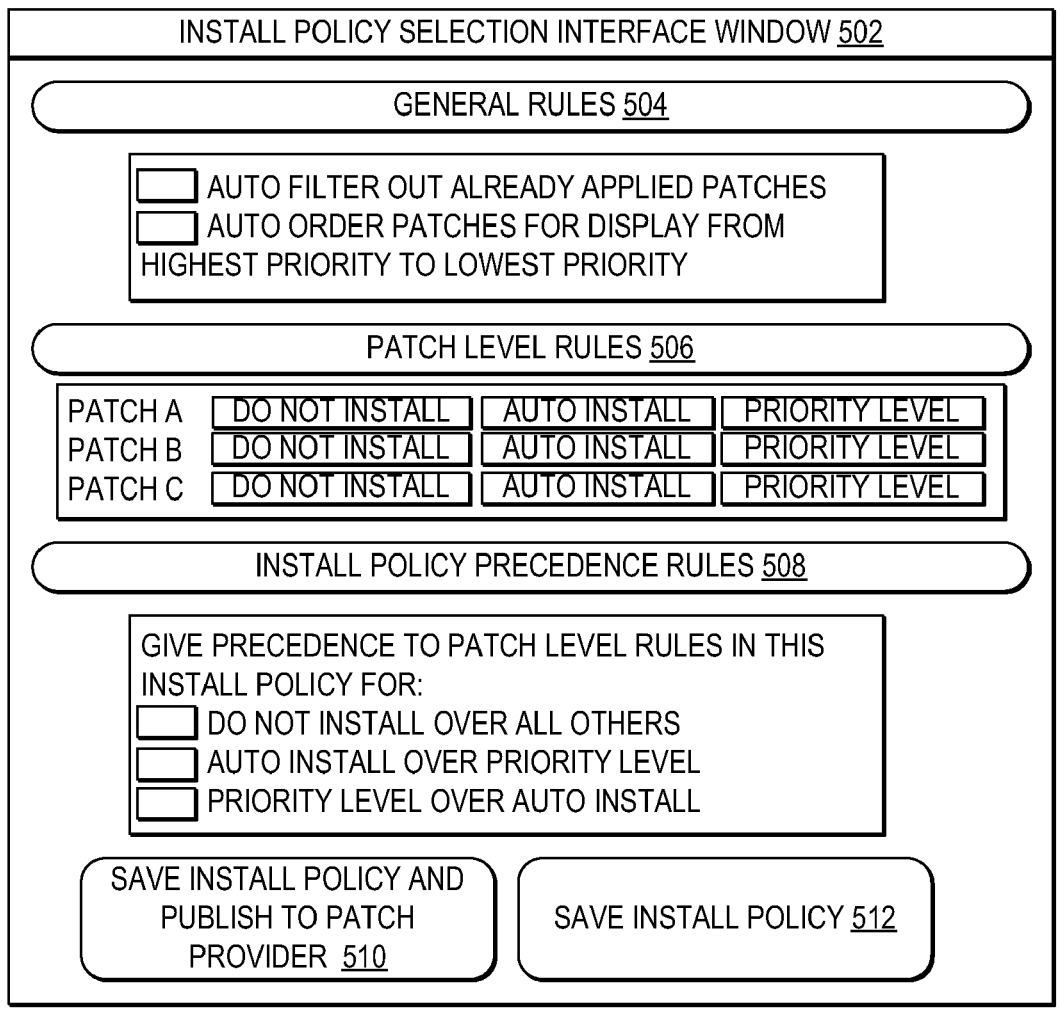
FIG. 5 is an illustrative block diagram depicting an example of an interface for customer selection of an install policy.

Referring now to FIG. 5, an illustrative block diagram depicts an example of an interface for customer selection of an install policy. In the example, within an interface window 502 facilitated by an application programming interface of the install program, the customer may select from general rules 504, such as a rule to automatically filter out any patches already installed on the particular system, a rule to automatically list patches according to priority level. In addition, in the example, a customer may select patch level rules 506, such as, for each patch, selecting whether to automatically install the patch, to disallow installation of the patch, or to assign a particular priority level to the patch. Further, a customer may select install policy combination rules 508, such as, selecting to give particular types of policies precedence over other types of policies. For example, a customer may select to give a "do not install" policy for a patch precedence over settings for that patch in any other policies. In another example, a customer may select to give an "auto install" setting for a particular patch precedence over any priority level settings for the particular patch in other install policies. Further, in another example, a customer may select to give a "priority" policy precedence over an "auto install" policy for a patch, such that if one policy assigns a priority level to a patch and another assigns a patch to be automatically installed, the patch is assigned a priority level, but not automatically installed. It is important to note that additional or alternate types of rules and policies may be set.

A customer may also select, within interface window 502 to save the selections as an install policy by selecting save policy button 512. In addition, a customer may select, within interface window 502 to save the selections as an install policy and publish the selections to the patch provider by selecting button 510. In addition, a customer may be provided with additional options when saving the selections, including, but not limited to, a selection of where to save the selections as an install policy and the format for saving the selections as an install policy.

The application programming interface that facilitates interface window 502, although not depicted, also facilitates conversation of the selections into a patch policy document or other data type that is storable and transferable. In one example, a patch policy may be stored as an XML document, where a standard format is defined for patch policies and a customer's selections within interface window 502 are automatically converted into the XML document meeting the requirements of the standard format. In another example, a software provider may provide an interface through which a customer may select patch policy preferences and the software provider converts the patch policy into another format understandable by the software provider's install program.

Figure 6:
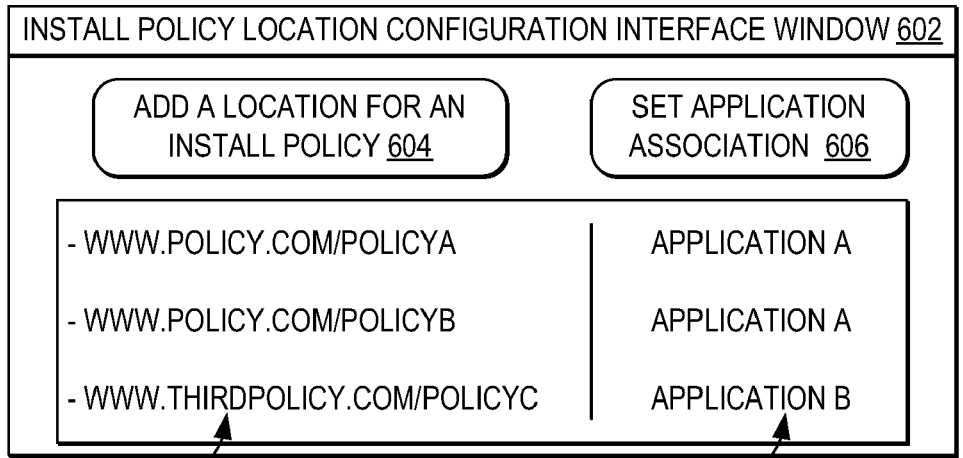
FIG. 6 is an illustrative block diagram depicting an interface for customer configuration of a patch policy location.

With reference now to FIG. 6, an illustrative block diagram depicts an example of an interface for customer configuration of a configured patch policy location. In the example, within an interface window 602 facilitated by an application programming interface of the install program, the customer may select one or more locations of patch policies.

In the example, the user may select an option 604 to add a location for an install policy. In particular, the user may select one or more storage locations, as illustrated at reference numeral 608, where each location may include one or more of a local storage location or a network accessible storage location. Further, in specifying a network accessible storage location, a user may specify the address of a particular service or service provider and a title for a patch policy, where the service or service provider accesses the patch policy based on the title.

In addition, in selecting storage locations of patch policies, the user may select an option 606 to set an application or other association to the location. In particular, the user may select one or more applications or other associations, as illustrated at reference numeral 610. In one example, an install program may facilitate application of patches for multiple separate applications and a customer may specify a separate patch policy for each application.

Further, in selecting storage locations, the user may prioritize the locations in order of precedence. In particular, instead of, or in addition to, specifying a rule for combining multiple patch policies, a user may prioritize the locations and the patch update controller uses the prioritization when combining patch policies.

Once a user completes selection of location preferences within interface window 602, the application programming interface may convert and store the selected preferences as a configuration file representing the configured patch policy location. In addition, it is important to note that a user may open a configuration file into a text editor and manually update the location preferences. Further, it is important to note that the options illustrated with reference to interface window 602 may be opened within a browser window of a browser accessing a service for enabling a user to configure install policy locations.

Figure 7:
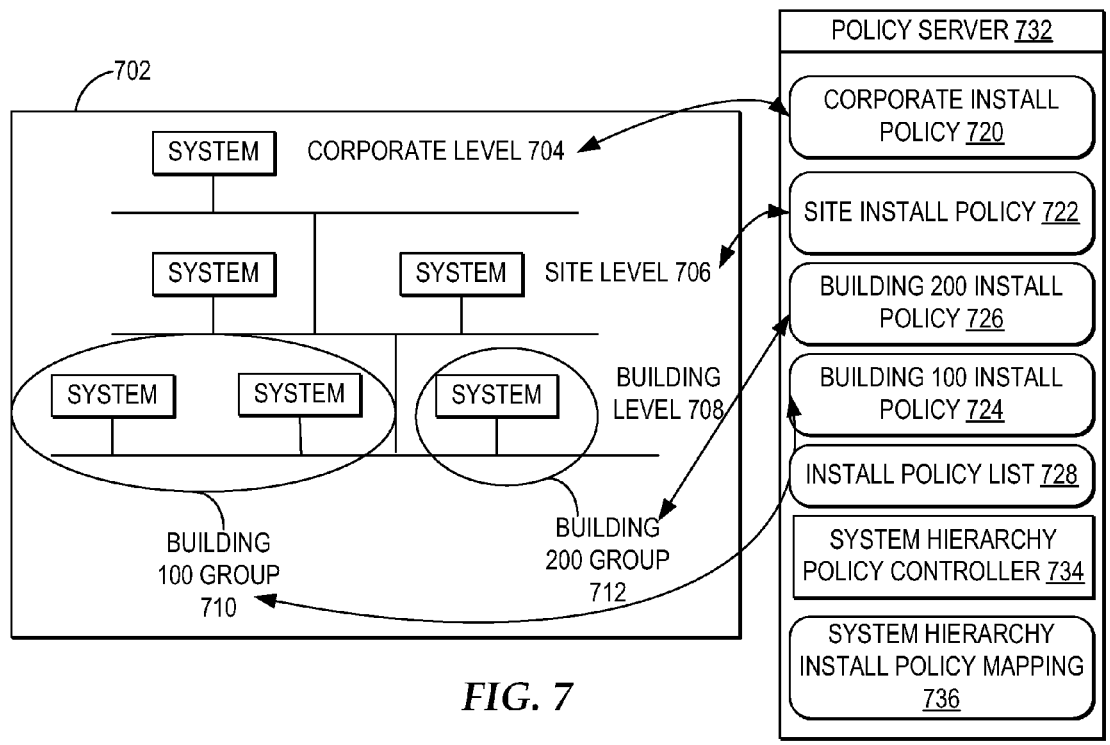
FIG. 7 is a block diagram illustrating of a hierarchical install policy system based on a system hierarchy of systems within a network environment.

Referring now to FIG. 7, a block diagram illustrates a block diagram of a hierarchical install policy system based on a system hierarchy of systems within a network environment. It will be understood by one with skill in the art that systems connected via a network may be described by multiple types of hierarchies and other system level diagrams.

In the example, a system diagram illustrates a hierarchy 702 of several systems within a network of systems, where each system is represented in the hierarchy to represent a location of the client system. In other embodiments, each system may be organized in a hierarchy of systems according to other characteristics.

In particular, in the example, at a first level 704, systems operate at a "corporate" level, at a second level 706, systems operate at an "site" level, and at a third level 708, one selection of systems operate at a "building 100" group 710 and another selection of systems operate at a "building 200" group 712.

In addition, in the example, a separate selection of policies is associated with each system level within hierarchy 702. In particular, in the example, a corporate install policy 720 is associated with first level 704, a site install policy 722 is associated with second level 706, a "building 100" install policy 724 is associated with "building 100" group 710 and a "building 200" install policy 726 is associated with "building 200" group 712.

In the example, when a customer selects to install patches at a particular system, the position of that system within hierarchy 702 indicates which install policies should be applied for filtering the patches to be installed at that particular system. For example, for a system at first level 704, only corporate install policy 720 would apply, but for a system at "building 100" group 710, corporate install policy 720, site install policy 722, and "building 100" install policy 724 would apply.

For the install program to access the required selection of install policies, the configured install policy location must point to the required selection of patch policies. The actual locations of the patch policies, and the addressing requirements, however, may vary from network to network. Further, for a customer to access the addressing locations of applicable patch policies, different types of features may be implemented.

In the example, a policy server 732 includes policies 720, 722, 724, and 726 which are each assigned to a network address. Thus, a customer configuring an install program to access one or more of polices 720, 722, 724, and 726 may configure the install policy locations to the network addresses of the applicable policies. For example, a customer configuring an install program at one of the systems within "building 200" group 712 would specify the network address locations of policies 720, 722, and 726 as the configured install policy location for the install program.

In addition, as illustrated at reference numeral 730, policy server 732 includes an install policy list 728, that is a list of the network addressing of the patch policies included on policy server 732. A customer may access install policy list 728, select the applicable patch policies, and apply the selected patch policies as the configured patch policy locations of the install program.

In another example, policy server 732 also includes a system hierarchy policy controller 734 and a system hierarchy install policy mapping 736. System hierarchy policy controller 734 receives requests for install policies from install programs with an identifier of the particular system at which the install program is running and system hierarchy policy controller 734 scans system hierarchy install policy mapping 736 to determine the position of the system in the hierarchy and to select which install policies apply to that particular system. System hierarchy policy controller 734 accesses the selection of applicable install policies and returns the selection of install policies to the requesting install program. Thus, a customer configuring an install program may configure the install policy location as the network address of policy server 732 and system hierarchy policy controller 734 of policy server 732 determines and returns the selection of patch policies that apply to the particular system.

In other examples, although not depicted, install policies 720, 722, 724, and 726 may be distributed among multiple policy servers. In addition, install policies 720, 722, 724, and 726 may be automatically distributed from policy servers, to client systems, responsive to customer requests to download install policies to a particular client system, independent of requests by install programs.

It is important to note that while the examples depicted in FIG. 7 show a system hierarchy example and install policy distribution and addressing example, in additional or alternate embodiments, other types of system hierarchies may be implemented and other types of install policy distribution and addressing may be implemented. In addition, it is important to note that while in the examples depicted in FIG. 7, install policies are generally referred to, in additional or alternate embodiments, at each system level or group, different install policies may be set for different applications.

Figure 8:
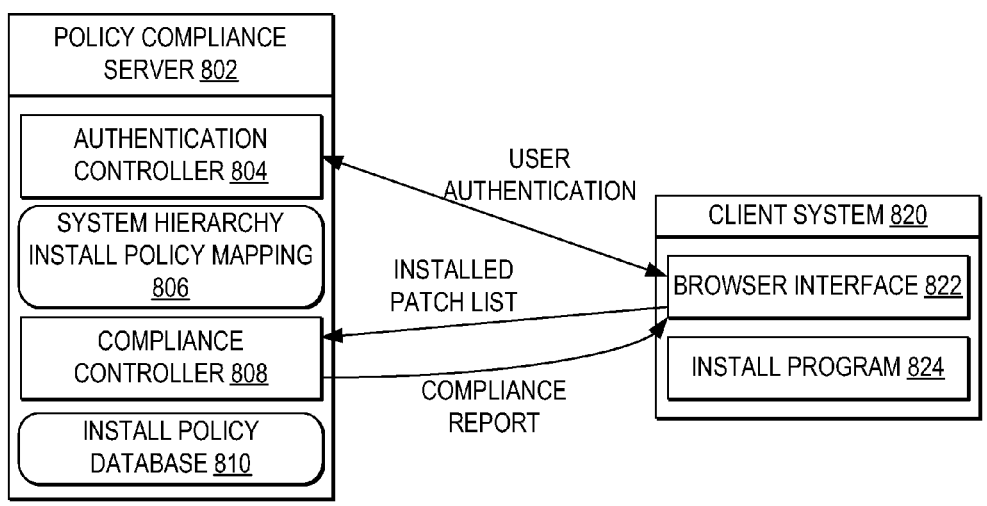
FIG. 8 is a block diagram depicting an install policy verification service for determining whether a particular client system is in compliance with install policies for that particular client system and distributing install policy locations for bringing the particular client system to compliance.

With reference now to FIG. 8, a block diagram depicts an install policy verification service for determining whether a particular client system is in compliance with install policies for that particular client system and distributing install policy locations for bringing the particular client system to compliance. In the example, a policy compliance server 802 includes an authentication controller 804. A user at client system 820, through a browser interface 822 or other network interface, requests to log in at policy compliance server 802 and authentication controller 804 verifies the requesting user is an authorized user. In addition, policy compliance server 802 includes a system hierarchy install policy mapping 806, as also described with reference to FIG. 7. In particular, system hierarchy install policy mapping 806 maps one or more of the policies in an install policy database 810, to each hierarchical level.

A compliance controller 808 first determines which install policies, from among multiple policies stored within install policy database 810, apply to client system 820, based on system hierarchy install policy mapping 806. Next, compliance controller 808 combines the applicable patch policies into a combined patch policy.

Compliance controller 808 receives a list of the currently installed patches on client system 820 from client system 820. In one example, an install program, other application, or operating system function running at client system 820 may detect and provide a list of the currently installed patches on client system 820. In another example, compliance controller 808 may run an installation detection program that controls searching of client system 820 or compliance controller 808 may download an installation detection program for running on client system 820 to detect the currently installed applications and patches.

Once compliance controller 808 determines the combined install policies applicable to client system 820 and the currently installed patches on client system 820, compliance controller 808 determines whether client system 820 is in compliance with the install policies that apply to client system 820 and delivers a compliance report indicating the current compliance. If client system 820 is not in compliance with the install policies that apply to client system 820, then compliance controller 808 may deliver the compliance report with the locations of the combined install policies or the locations of the install policies applicable to client system 820, for use in configuring the configured install policy locations for install program 824 at client system 820.

Figure 9:
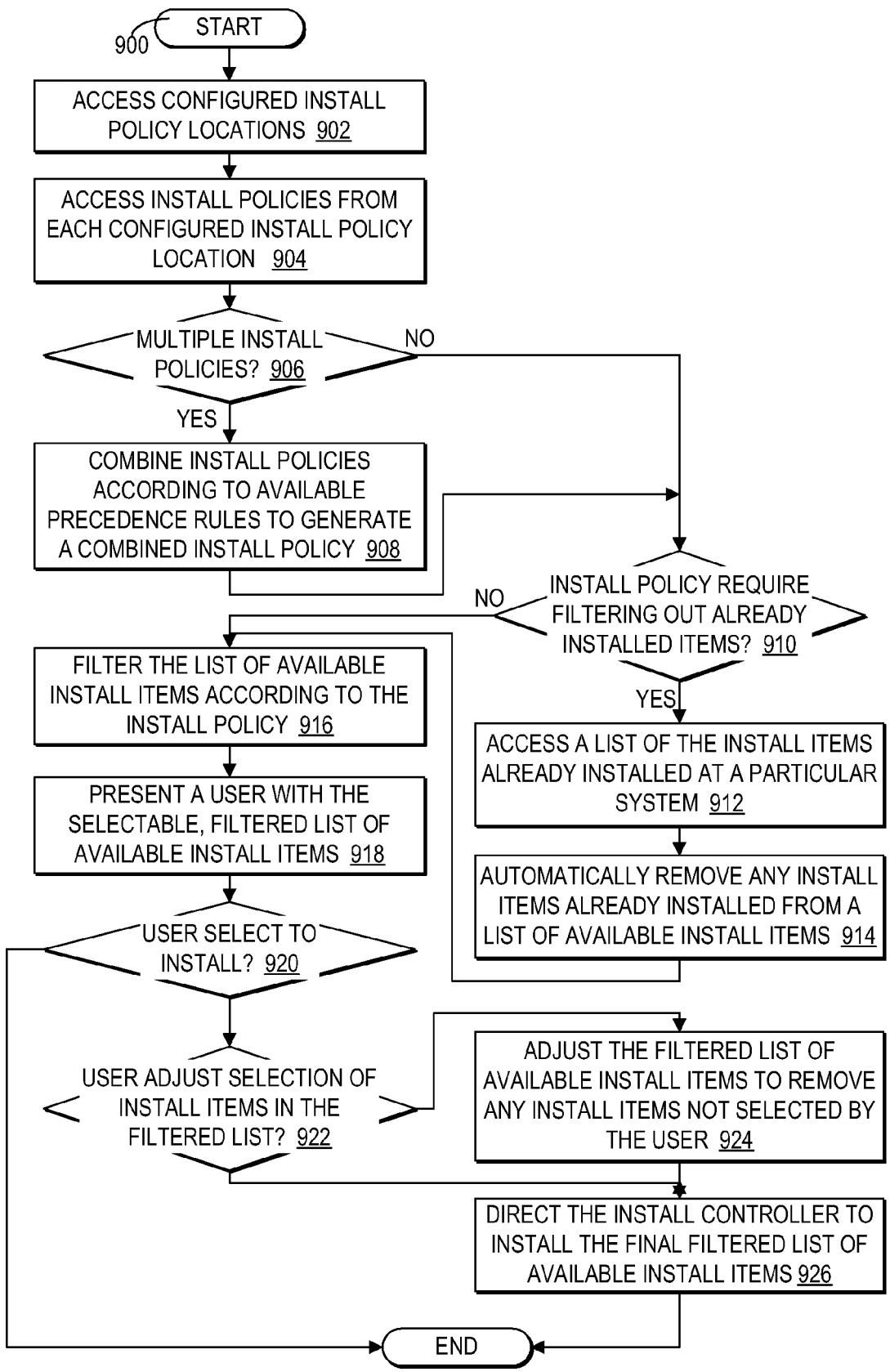
FIG. 9 is a high level logic flowchart illustrating a process and program for determining a filtered selection of patches according to customer patch policies.

Referring now to FIG. 9, a high level logic flowchart illustrates a process and program for determining a filtered selection of patches according to customer patch policies. In the example, the process starts at block 900 and thereafter proceeds to block 902. Block 902 depicts accessing any configured install policy locations. Next, block 904 illustrates accessing the install policy from each configured install policy location. Thereafter, block 906 depicts a determination whether multiple install policies are returned. If only a single install policy is returned, then the process passes to block 910. If multiple install policies are returned, then the process passes to block 908. Block 908 illustrates combining install policies according to available precedence rules to generate a combined install policy, and the process passes to block 910.

Block 910 depicts a determination whether the install policy requires filtering out already install items at a system. If the install policy requires filtering out already installed items, then the process passes to block 912. Block 912 illustrates accessing a list of the install items already installed at a particular system. Next, block 914 depicts automatically removing any install items already installed from a list of available install items, and the process passes to block 916.

Returning to block 910, if the install policy does not require filtering out already installed items, then the process passes to block 916. Block 916 depicts filtering the list of available install items according to the install policy. Next, block 918 illustrates presenting a user with the selectable, filtered list of available install items. Thereafter, block 920 depicts a determination whether the user selects to install the install items. If the user does not select to install the install items, then the process ends. If the user does select to install the install items, then the process passes to block 922. Block 922 illustrates a determination whether the user selected to adjust the selection of install items in the filtered list before selecting to install. If the user does not select to adjust the selection of install items in the filtered list, then the process passes to block 926, as will be further described. Otherwise, if the user selected to adjust the selection of install items in the filtered list, then the process passes to block 924. Block 924 depicts adjusting the filtered list of available install items to remove any install items not selected by the user, and the process passes to block 926. Block 926 depicts directing the install controller to install the final filtered list of available install items, and the process ends.

Figures 10, 11:
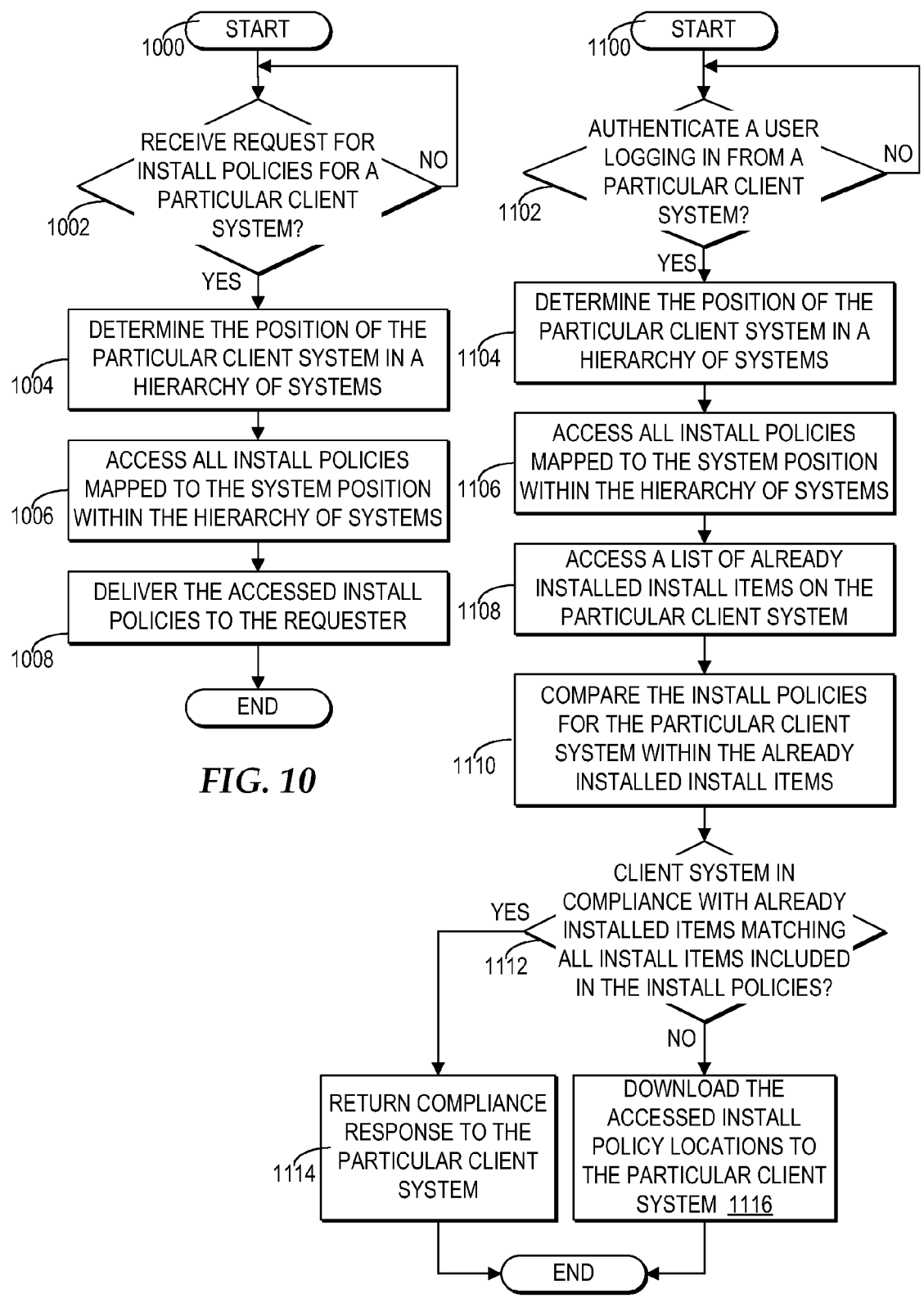
FIG. 10 is a high level logic flowchart depicting a process and program for selecting install policies according to a request for install policies for a particular client system.
FIG. 11 is a high level logic flowchart illustrating a process and program for monitoring user compliance to patch policies for a specific client system within a network.

With reference now to FIG. 10, a high level logic flowchart depicts a process and program for selecting install policies according to a request for install policies for a particular client system. As illustrated, a policy server may perform the process and program, starting at block 1000. Next, block 1002 depicts a determination whether a policy server receives a request for install policies from an install program running on a particular client system. If a request for install polices from an install program is received, then the process passes to block 1004.

Block 1004 illustrates determining the position of the particular client system in a hierarchy of systems. Next, block 1006 depicts accessing all install policies mapped to the system position within the hierarchy of systems. Thereafter, block 1008 illustrates delivering the accesses install policies to the requesting install program running on the particular client system, and the process ends.

Referring now to FIG. 11, a high level logic flowchart depicts a process and program for monitoring user compliance to patch policies for a specific client system within a network. In the example, a server system performs the process and program as illustrated starting at block 1100 and thereafter proceeding to block 1102. Block 1102 depicts a determination whether the server system authenticates a user logging in from a particular client system. If the server authenticates a user, then the process passes to block 1104. Block 1104 depicts determining the position of the particular client system in a hierarchy of systems. Next, block 1106 depicts accessing all install policies mapped to the system position within the hierarchy of systems. Thereafter, block 1108 depicts accessing a list of already installed install items on the particular client system. Next, block 1110 depicts comparing the install policies for the particular client system with the already installed install items, and the process passes to block 1112.

Block 1112 depicts a determination whether the client system is in compliance because the already installed install items match the install items included in the install policies. If the client system is in compliance, then the process passes to block 1114. Block 1114 illustrates returning a compliance response to the particular client system indicating full compliance, and the process ends. Otherwise, at block 1112, if the client system is not in compliance, then the process passes to block 1116. Block 1116 depicts downloading the locations of the accesses install policies to the particular client system, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for filtering a selection of install items from among a plurality of items installable by an install program, comprising:
   receiving, using a processor, at a client system, an install program for applying at least one install item from among a plurality of items installable by said install program to at least one application at said client system and for filtering said plurality of items installable by said install program according to an install policy, wherein said install program requests a user at said client system to configure at least one location of at least one policy system that is to be accessed by the client system via a network to gather at least one install policy, wherein said at least one install policy specifies a policy for filtering out a selection of install items from among a plurality of items installable by said install program;
   displaying, using said processor, by said install program, a graphical user interface for a user to enter and configure said at least one location of said at least one install policy;
   receiving, via said graphical user interface, said user enter at least one network address;
   responsive to said user entering said at least one network address within said graphical user interface, automatically configuring, using said processor, by said install program, said at least one network address as said at least one location of said at least one install policy;
   retrieving, using said processor, by said install program, said at least one install policy from said at least one location via said network;
   filtering a list of said plurality of items installable by said install program to only comprise a particular selection of install items for said client system as directed by said at least one install policy and specifying a priority level for each install item within said particular selection of install items according a separate priority level set for each said install item within said at least one install policy.

2. The method of claim 1, wherein said plurality of items installable by said install program comprise a plurality of patches to one or more applications.

3. The method of claim 1, further comprising:
   accessing a list of already installed items at said particular client system;
   filtering said list of said plurality of items installable by said install program to remove said list of already installed items; and
   filtering said filtered list of said plurality of items installable by said install program to comprise said particular selection of install items for said client system as directed by said at least one install policy.

4. The method of claim 1, further comprising:
   responsive to accessing a plurality of separate install policies from a plurality of separate locations at said client system, combining, by said client system, said plurality of install policies into a combined install policy according to at least one precedence rule.

5. The method of claim 1, further comprising:
   automatically triggering said install program to install said particular selection of install items at said client system as directed by said at least one install policy.

6. The method of claim 1, further comprising:
   presenting said user with a selectable list of said particular selection of install items and a selectable option to trigger installation within a display area;
   responsive to a user selection of only a second selection of said particular selection of install items and a user selection of said selectable option to trigger installation, triggering said install program to install only said second selection of said particular selection of install items; and
   responsive to a user selection of said selectable option to trigger installation, triggering said install program to install said particular selection of install items.

7. The method of claim 1, wherein a software provider provides said install program for applying patches to at least one application provided by said software provider and said user is a customer with said at least one application already installed on said client system.

8. The method of claim 1, wherein said at least one install policy comprises at least one rule for at least one install item indicating at least one of automatically installing said at least one install item, disallowing installation of said at least one install item, and a priority level for said at least one install item.

9. The method of claim 1, wherein said at least one install policy comprises at least one rule for combining said at least one install policy with another install policy.

10. A system for managing the filtering of a selection of install items from among a plurality of items installable by an install controller, comprising:
    at least one computer system enabled to communicatively connect to at least one other computer system over a network;
    an install update controller distributed across said at least one computer system, wherein said install update controller is enabled to direct an install controller to install a particular selection of install items from among a plurality of items installable by said install controller at said at least one computer system;
    said install update controller comprising means for requesting a user configure at least one location of at least one other system that is to be accessed via said network to gather at least one install policy, wherein said at least one install policy specifies a policy for filtering items out of said plurality of items installable by said install controller at said at least one computer system, wherein said at least one install policy specifies filtering policies separate from a second policy set by a provider of said install update controller;
    said install update controller comprising means for displaying a graphical user interface for a user to enter and configure said at least one location of said at least one install policy;
    said install update controller comprising means for receiving, via said graphical user interface, said user enter at least one network address;
    said install update controller comprising means, responsive to said user entering said at least one network address within said graphical user interface, for automatically configuring, using said processor, by said install program, said at least one network address as said at least one location of said at least one install policy;

said install update controller comprising means for retrieving said at least one install policy from said at least one location via said network; and said install update controller comprising means for filtering a list of said plurality of items installable by said install program to only comprise said particular selection of install items as directed by said at least one install policy and specifying a priority level for each install item within said particular selection of install items according a separate priority level set for each said install item within said at least one install policy.

11. The system of claim 10, said install update controller further comprising means, responsive to accessing a plurality of separate install policies from a plurality of separate locations, for combining said plurality of install policies into a combined install policy according to at least one precedence rule.

12. The system of claim 10, said install update controller further comprising means for automatically triggering said install controller to install said particular selection of install items at a client system accessible via said network as directed by said at least one install policy.

13. The system of claim 10, wherein said at least one install policy comprises at least one rule for at least one install item indicating at least one of automatically installing said at least one install item, disallowing installation of said at least one install item, and a priority level for said at least one install item.

14. A system for controlling access by an install program to at least one separate install policy, comprising:

a policy server communicatively connected over a network to a plurality of client systems within a network environment, said policy server comprising a plurality of separate install policies for distribution to separate install programs associated with said plurality of client systems, wherein each said separate install program is configurable by a user to a location of an install policy for filtering a list of installable items by each said separate install program;

said policy server comprising a hierarchical mapping of said plurality of client systems, wherein each of said plurality of client systems is mapped to one of a plurality of hierarchical levels within said network environment;

said policy server comprising a listing of at least one separate install policy from among said plurality of separate install policies associated with each of said plurality of hierarchical levels; and said policy server, responsive to receiving a request for at least one install policy by a particular install program associated with a particular client system from among said plurality of client systems, for determining a particular hierarchical level of said particular client system within said hierarchical mapping, for accessing a selection of at least one separate install policy associated with said particular hierarchal level according to said listing, and for delivering said selection of at least one separate install policy to said install program.

* * * * *